Aug. 9, 1932.                W. KLENK                1,870,459
            DEVICE FOR STEAMING BREAD IN BAKE OVENS
                    Filed Dec. 3, 1931
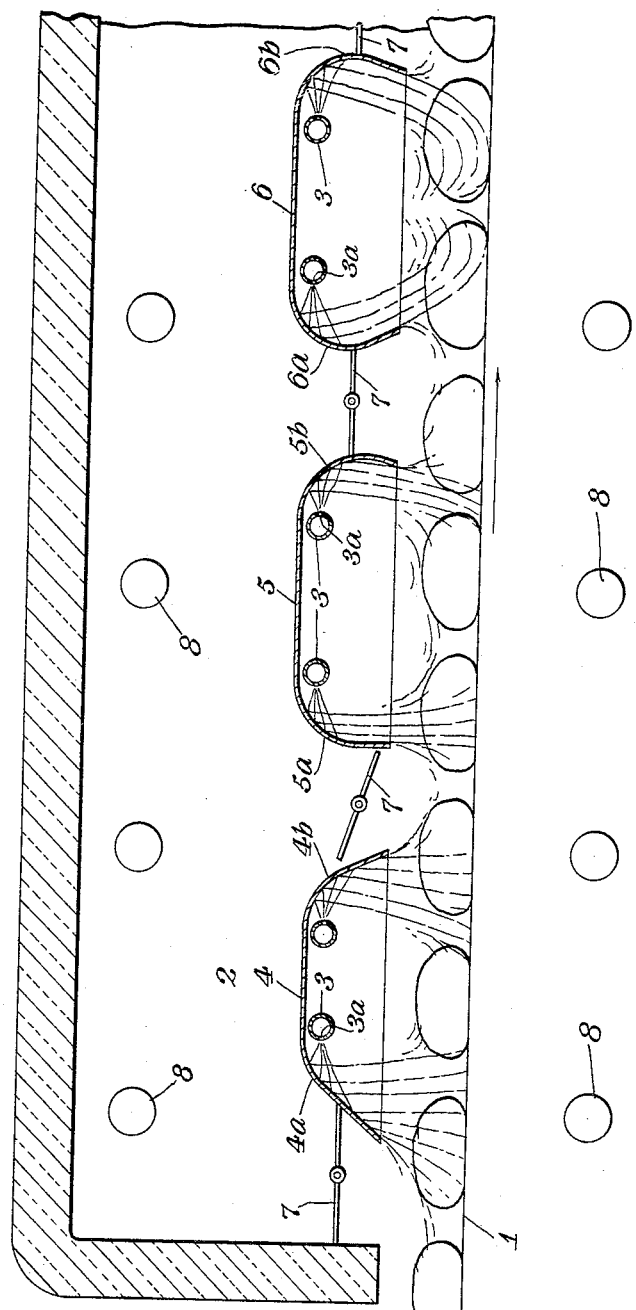
                                        Inventor
                                    WILLY KLENK
                            By  George B. Willcox
                                        Attorney Patented Aug. 9, 1932

1,870,459

UNITED STATES PATENT OFFICE

WILLY KLENK, OF STUTTGART-CANNSTATT, GERMANY, ASSIGNOR TO BAKER PERKINS COMPANY, INC., OF SAGINAW, MICHIGAN, A CORPORATION OF NEW YORK

DEVICE FOR STEAMING BREAD IN BAKE OVENS

Application filed December 3, 1931, Serial No. 578,757, and in Germany December 11, 1930.

This invention relates to steam-injector jets in bake ovens having a traveling conveyor for moistening unbaked loaves of bread during the preliminary stages of the baking process, and has for its object the provision of a baffle or a steam deflecting hood, against which the jet or jets of steam are directed and from which the steam is deflected at low velocity down onto the loaves in a diffused mist or fog, increasing the area of effectiveness of each jet.

A further object of the invention is to provide a series of baffle hoods and steam jets placed along the first portion of the oven conveyor, each baffle surface concavely curved to deflect the steam of each injector, and each successive surface curved to a greater extent, proceeding from the inlet end of the oven. Thus I provide for increasing the intensity of the steaming of the loaves as they become hotter and increase in size during their travel through the introductory chamber of the oven, while using steam injectors of identical capacity in co-operation on each baffle.

Heretofore it has been the practice to moisten loaves by steam jets playing directly onto the bread. The high velocity of such a jet presents certain disadvantages which my invention overcomes. For example, the force of the steam tends to hinder the development and expansion of the bread, which at this point in the baking should be as full and rapid as possible in order that the loaves shall be of maximum size before the outer crust begins to set and form.

In baking hearth bread the directional character of a high-velocity direct steam jet has the disadvantage that it tends to moisten the loaves unevenly. The size of the loaves are "shadowed" by the bulging top portion, so that they can not expand to the fullest desired extent; also such a jet if directed at an angle to the oncoming loaves will moisten one side more than the other.

The construction of the steam injectors with my baffle hood is simple and economical. For example, the steam injector pipe extending transversely of the oven needs simply to be drilled with outlet holes standard in size, and the use of regulating valves or steam nozzles of accurate sizes is not necessary. Regulation of the intensity of steaming can be accomplished by mounting each steam pipe rotatably, so that the angle at which the steam jet strikes the curved baffle surface can be adjusted and the diffusion of the deflected steam can be varied within reasonable limit.

The drawing shows the invention as applied to a bake oven of the well known traveling-plate conveyor type.

The conveyor 1 travels through the introductory chamber or conditioning chamber 2 of the oven in which the initial heating and expansion of the bread takes place before it traverses the baking section of the oven proper.

Above the conveyor 1 in the conditioning chamber are steam injectors 3 consisting of pipes extending transversely of the conditioning chamber 2 and drilled with a plurality of apertures 3a extending in a line lengthwise of the pipe. The injectors are connected to a supply of low pressure steam, not shown. Above each pair of injectors is a baffle 4, 5 and 6, curved downwardly at each end to form a concaved deflecting surface 4a, 4b, 5a, 5b, 6a and 6b, against which the steam jets from the injectors 3 are directed at such an angle that the steam will be deflected down and diffused over the loaves in the desired manner.

Referring to the drawing, it can be seen that the first deflecting surface 4a is curved for a short part of its length and its lower end is inclined relatively slightly to the conveyor so that the deflected steam is diffused over a large area. This wide angle diffusion of the steam jet results in the entrainment of a large volume of air with the steam, so that the cool loaves which have just entered the oven are moistened relatively slightly and gently, just sufficient to prevent their drying out at this low temperature.

The deflecting surface 4b is curved to a slightly greater extent and terminates in a plane more nearly vertical to deflect the steam more directly downwardly and to diffuse it to a lesser extent. The resulting denser cloud of steam is desired since at this point the loaves are slightly warmer and require more moisture to maintain the elasticity of the skin surface.

The succeeding baffle surfaces 5a, 5b are successively increasingly curved to produce increasingly dense mists of steam to adequately moisten the hotter and larger surfaces of the loaves as they travel further into the oven, as indicated by the broken lines representing the path of the steam jet.

The last baffle 6 with surfaces 6a and 6b is designed to produce a very concentrated cloud of steam which will reach every surface of the dough piece and provide the maximum moistening effect needed during the last stages of expansion of the loaves. As indicated in the drawing the steam jets are diffused least by baffle 6, but are directed inwardly from the surfaces 6a, 6b to converge and produce a swirling cloud of vapor which will reach every part of the sides of the dough pieces.

Between the successive baffle units 4, 5 and 6 are provided adjustable dampers 7 for drawing off the surplus steam from beneath the hoods or to permit a free flow of heat in case bread is baked in the oven without preliminary steaming. Burners 8, or other suitable means of heating the conditioning chamber 2 are indicated diagrammatically in the drawing.

The injector pipes 3 may be mounted for rotation about their longitudinal axes in known manner, so that the jets may be directed upwardly at a greater angle to the deflecting surface, or may be directed horizontally, or perhaps slightly downwardly to adjust the intensity of the steaming within the zone of influence of each of the jets.

By my invention I have provided an efficient, flexible system for the pre-treating of bread, which is economical to build, efficient in operation and which is capable of adjustment through varied conditions with a minimum of complicated valves and other devices.

Having thus described my invention, what I claim and desire to secure by Letters Patent is:

1. In combination with a bake oven having a traveling conveyor, a steam injector for producing a jet of steam located in the feed-in end of said oven above said conveyor, and a baffle hood positioned above said injector having at least a portion of its lower face inclined to the conveyor to present a deflecting surface against which the steam jet is directed, whereby the steam is deflected downward in a diffused mist over the conveyor.

2. In combination with a bake oven having a traveling conveyor, a plurality of steam injectors for producing jets of steam, spaced along and positioned above said conveyor from the feed-in opening of said oven, and a concave deflecting surface above and at the side of each injector against which the steam jets from the associated injector are directed to diffuse the steam downward over the conveyor, each of such deflecting surfaces proceeding from said feed-in opening, being curved to a greater extent than the one preceding, whereby the steam from each successive injector is diffused to a less degree and loaves on said conveyor are progressively more intensively steamed as their temperature and volume increases.

In testimony whereof, I affix my signature.
WILLY KLENK.